(12) United States Patent
Abe et al.

(10) Patent No.: US 7,614,062 B2
(45) Date of Patent: Nov. 3, 2009

(54) OPTICAL DISK DEVICE

(75) Inventors: Yukinobu Abe, Matsudo (JP);
Nobuyuki Isoshima, Hitachinaka (JP);
Ikuo Nishida, Ebina (JP)

(73) Assignees: Hitachi, Ltd., Tokyo (JP); Hitachi-LG Data Storage, Inc, Tokyo (JP)

( * ) Notice: Subject to any disclaimer, the term of this patent is extended or adjusted under 35 U.S.C. 154(b) by 572 days.

(21) Appl. No.: 11/528,515

(22) Filed: Sep. 28, 2006

(65) Prior Publication Data

US 2007/0220534 A1   Sep. 20, 2007

(30) Foreign Application Priority Data

Mar. 14, 2006   (JP) .............................. 2006-069466

(51) Int. Cl.
*G11B 33/14* (2006.01)
(52) U.S. Cl. .................................................. 720/649
(58) Field of Classification Search .............. 720/649, 720/651, 601
See application file for complete search history.

(56) References Cited

U.S. PATENT DOCUMENTS

2006/0064710 A1\* 3/2006 Huang et al. ................ 720/649
2006/0288358 A1\* 12/2006 Wu ............................. 720/649

FOREIGN PATENT DOCUMENTS

| JP | 2001-319469 | 11/2001 |
| JP | 2003-151259 | 5/2003 |
| JP | 2004-310883 | 11/2004 |

\* cited by examiner

*Primary Examiner*—Allen T Cao
(74) *Attorney, Agent, or Firm*—Antonelli, Terry, Stout & Kraus, LLP.

(57) ABSTRACT

This invention provides an optical disk device in which heat generated from an optical head and circuit board is dissipated without introduction of outside air or use of a fan. A through portion is provided in part of the mechanical block or outside of the portion on which a tray is projected for carrying a disk for reproduction or write, such that it extends from a disk side portion with respect to the tray to a portion opposing the disk with respect to the tray, in order to introduce air flow generated by disk rotation to an optical head and circuit board and dissipate heat generated at the time of recording or reproduction.

10 Claims, 7 Drawing Sheets

OPTICAL DISK DEVICE

BACKGROUND OF THE INVENTION

1. Field of the Invention

The present invention relates to an optical disk device, more particularly to a heat dissipation structure thereof.

2. Description of the Related Art

In recent years, the amount of heat generated from a device drive LSI, disk rotation motor, optical head moving motor, optical head and the like has increased accompanied by demands for intensified recording density in the optical disk device, improvement of rotation speed and access velocity and the like. As a consequence, the temperature inside the disk device rises, so that its respective devices and components sometimes may exceed a limit temperature.

To avoid the temperature rise in the optical disk device, conventionally, air is taken compulsorily from outside of the device with a cooling fan so as to cool the inside of the drive unit and discharge out air having a raised temperature.

Japanese Patent Application Laid-Open No. 2001-319469 has described a structure for cooling air in the disk device with a Peltier element and blowing cooled air to an optical head with a fan. However, the Peltier element or fan has a problem that they need power and the fan produces noise.

Contrary to this, there is available a method for cooling air inside the drive unit using air flow induced by disk rotation without provision of any cooling fan. Japanese Patent Application Laid-Open No. 2003-151259 has described a structure in which cool air outside is sucked in through an assembled portion of the optical disk device and after it cools the optical head and circuit board, the air is discharged through an opening portion provided in a face opposing a front panel with flow induced by disk rotation.

Therefore, technology for dissipating heat generated inside the optical disk device without outside air is demanded. Japanese Patent Application Laid-Open No. 2004-310883 has described a structure in which a tray for carrying a disk has a through portion provided between a disk side area and an area opposing the disk and air flow induced by disk rotation is used for cooling the optical head and board.

[Patent document 1]: Japanese Patent Application Laid-Open No. 2001-319469

[Patent document 2]: Japanese Patent Application Laid-Open No. 2003-151259

[Patent document 3]: Japanese Patent Application Laid-Open No. 2004-310883

According to the technology described in the Japanese Patent Application Laid-Open No. 2004-310883, the tray portion is provided with a through portion. However, the through portion has a right or nearly right angle with respect to a rotation flow produced tangential to the disk by a disk rotation and thus, air flow to the optical head and board may weaken.

SUMMARY OF THE INVENTION

An object of the present invention is to provide an optical disk device capable of dissipating heat from components inside thereof without provision of a cooling fan or introduction of outside air.

In the optical disk device of the present invention, the through hole is formed between the edge portion of the tray and the side portion of the mechanical block base. When the disk is rotating, air flows from space on the disk side to space on the opposite side to the disk, of spaces on both sides of the tray.

According to the present invention, heat dissipation from components of the optical disk device is enabled without provision of the cooling fan or introduction of air from outside.

DESCRIPTION OF THE PREFERRED EMBODIMENTS

Figure 1:
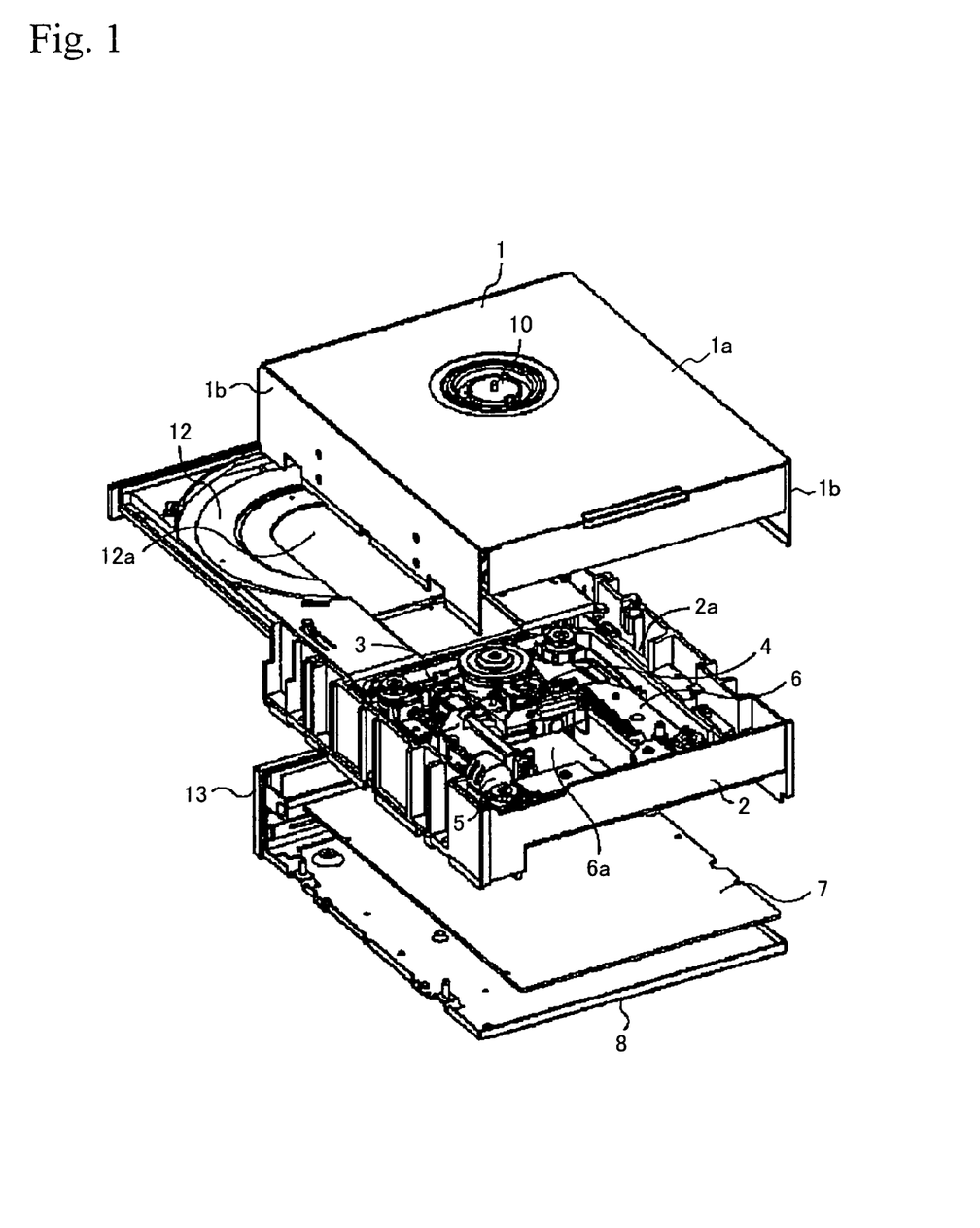
FIG. 1 is a exploded perspective view of a first example of the optical disk device of the present invention.

FIGS. 1 to 4 are drawings showing a first example of the optical disk device of the present invention. As shown in FIG. 1, the optical disk device of this example comprises a top cover 1, a mechanical block base 2 and a bottom cover 8. The top cover 1 has a top face 1a and side faces 1b and the top face 1a is provided with a clamper 10.

A chassis 6 is mounted on the mechanical block base 2 through a rubber damper (not shown) for vibration absorption. The chassis 6 is provided with a disk motor 3, an optical head 4 and an optical head feeding motor 5. The chassis 6 has an opening portion 6a. The optical head 4 can move in a disk radius direction within the opening portion 6a. A tray 12 is mounted on the mechanical block base 2. The tray 12 can be moved by a drive mechanism portion (not shown) between its projection position and retraction position. The tray 12 has an opening portion 12a. During a rotation of the disk, the optical head 4 can move in the disk radius direction within the opening portion 12a.

A circuit board 7 is mounted on the bottom cover 8. A front panel 13 is mounted on the front end of the bottom cover 8.

The mechanical block base 2 is surrounded by the top cover 1 at a top portion thereof, the circuit board 7 and the bottom cover 8 at the bottom portion and the front panel 13 at the front portion. A through hole 2a is provided inside the side portion of the mechanical block base 2. Air above the disk flows in under the disk through the through hole 2a within the optical disk device. Air in the optical disk device, particularly air around heat generating components under the disk flows to prevent the temperature in the optical disk device from rising. The function of the through hole 2a will be described later.

The way for using the optical disk device will be described. A disk (not shown) is placed on a tray 12 when the tray 12 is located at the projection position. The tray 12 is moved from the projection position to the retraction position by a drive mechanism portion (not shown). The disk is disposed on a turntable connected directly to the disk motor 3 and fixed tightly to the turntable by a clamper 10. The disk is rotated by the disk motor 3. The optical head 4 irradiates a disk being rotated with laser beam and reads information recorded in the disk with a reflection light and writes information by irradiating a recording disk with laser beam at a high output. The optical head 4 is carried by the optical head feeding motor from the inner periphery of the disk to the outer periphery or from the outer periphery to the inner periphery by the optical head feeding motor 5 during reading or writing of information.

Figure 2:
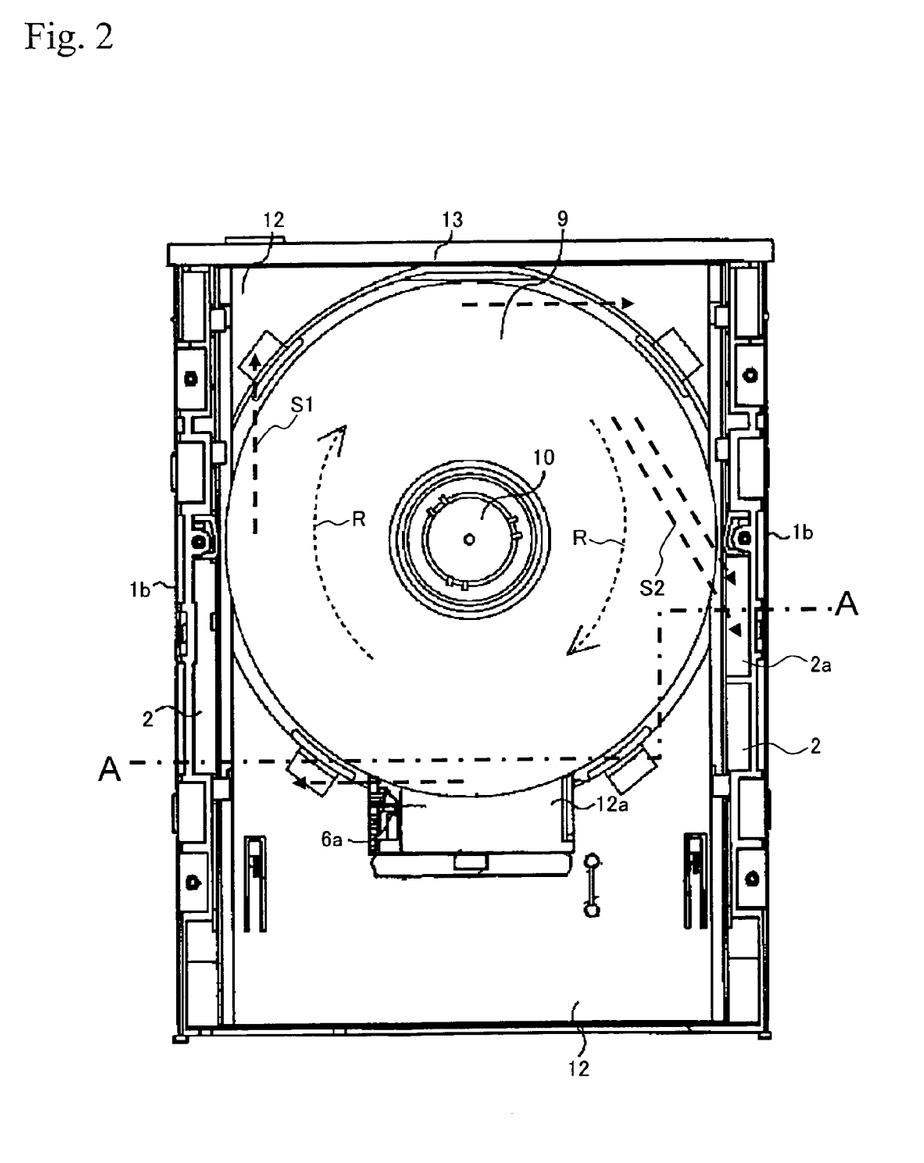
FIG. 2 is an explanatory diagram for explaining air flow in the first example of the optical disk device of the present invention.

FIG. 2 shows a condition in which a disk 9 loaded on the optical disk device is rotating. In FIG. 2, the upper face of the top cover 1 is omitted in its representation. The through hole 2a is formed between the edge portion of the tray 12 and the inner wall of the side portion of the mechanical block base 2. Thus, the through hole 2a is provided at least outside the tray 12. Further, the through hole 2a is disposed outside of the disk 9. The mechanical block base 2 has ribs. Therefore, the through hole 2a is formed between the two ribs.

If the disk is rotated in the direction of an arrow R as indicated in Figure, air in the vicinity of the disk surface receives a force in the tangential direction and centrifugal force as a result of rotation. On the right side of the optical disk drive unit as viewed from the front panel, a through hole 2a is provided. Thus on the left side of the optical disk device as viewed from the front panel, air collides with the side wall of the mechanical block base 2 so that air flows in the direction of an arrow S1 of dotted line. However, on the left side of the optical disk device as viewed from the front panel, air collides with the side wall of the mechanical block base 2 and enters the through hole 2a. Therefore, air flow is generated in the direction of an arrow S2 of dotted line.

Figure 3:
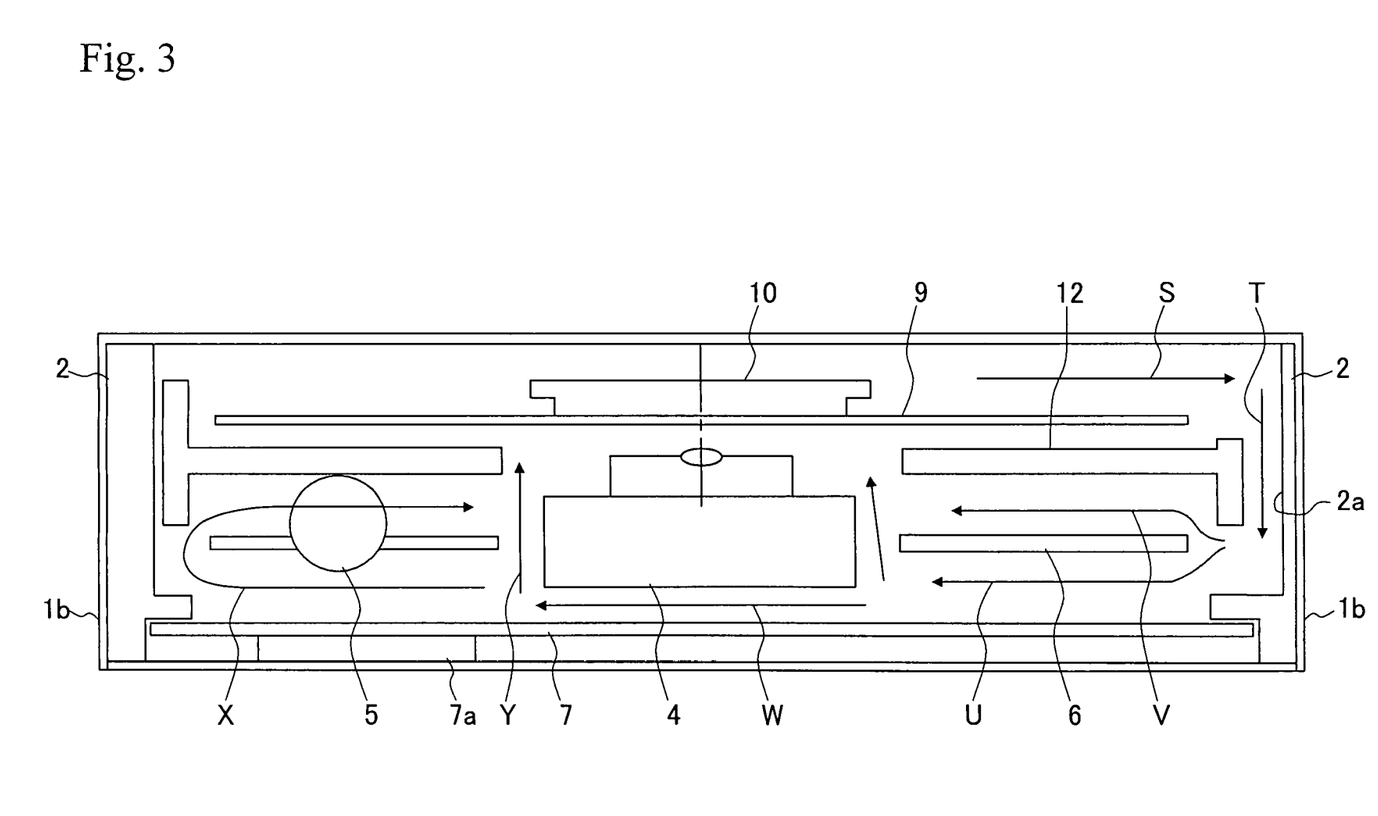
FIG. 3 is a drawing showing a sectional view taken along the line A-A in the first example of the optical disk device of the present invention in FIG. 2.

FIG. 3 is a drawing showing air flow within the optical disk device when a disk is rotating, indicating the sectional view taken along the line A-A in FIG. 2. As shown in FIG. 3, the circuit board 7 and a device drive LSI 7a located thereunder are mounted on the bottom cover 8. The through hole 2a is formed between the edge portion of the tray 12 and the side portion of the mechanical block base 2. Thus, the through hole 2a is provided outside the tray 12. Further, the through hole 2a is disposed outside the outer periphery of the disk 9.

With a rotation of the disk 9, air in the vicinity of the surface of the disk receives a force in the tangential direction and centrifugal force and moves toward the mechanical block base 2. Air collides with the side wall of the mechanical block base 2 and enters the through hole 2a as indicated by an arrow T. Consequently, air flow in the direction of an arrow S is generated. Air flow T after entering the through hole 2a flows inside the optical disk device as indicated with arrows U, V, W, X, Y. Therefore, heat dissipation of high temperature components and devices is enabled by generation of air flow inside the optical disk device.

Figure 4:
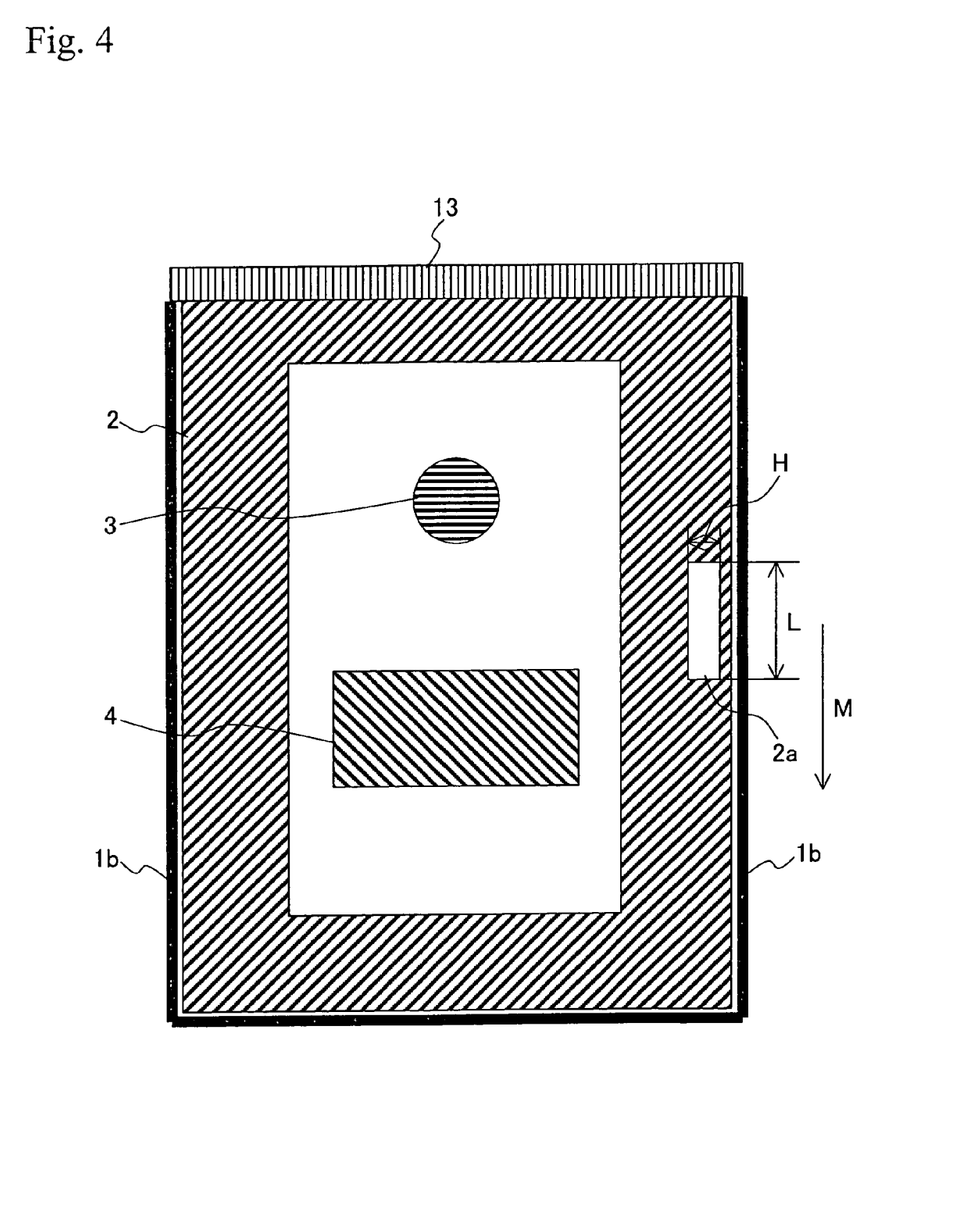
FIG. 4 is a projection drawing of major portions of the first example of the optical disk device of the present invention.

FIG. 4 shows schematically a projection drawing of the mechanical block base 2, the disk motor 3 and the optical head 4 of the optical disk device when the disk is rotating. The mechanical block base 2 is provided with the through hole 2a. When the width of the through hole 2a is H and the length thereof is L, the width H of the through hole 2a corresponds to an interval between the edge portion of the tray 12 and the inner wall of the side portion of the mechanical block base 2 as shown in FIG. 3. Although the length L of the through hole 2a is arbitrary, at least, it is more than twice the width H. The through hole 2a may be provided at an arbitrary position as indicated with an arrow M.

The inventor of the present invention analyzed stream of inside air flowing concerning both a conventional optical disk device provided with no through hole 2a and an optical disk device provided with the through hole 2a. In the optical disk device of the present invention, the through hole 2a is disposed on the left side as the optical disk drive unit is seen from its front panel side. For this analysis, with the width H of an opening portion of the through hole 2a kept constant and equal to the interval between the edge portion of the tray 12 and the inner wall of the side portion of the mechanical block base 2, the length L was changed arbitrarily. As a result of the analysis, it was made evident that the velocity of air flow in the vicinity of the optical head was up to about five times in the optical disk device of the present invention as compared with the conventional optical disk device when the length L of the opening portion of the through hole 2a is set to about half the radius of the disk.

Further, with the length of the opening portion L of the through hole 2a set to about 30% of the radius of the disk, air flow was analyzed by moving the position of the through hole 2a in an opposite direction to the front panel (direction of arrow M in FIG. 4) from the rotation center of the disk. As a result of the analysis, it was made evident that the velocity of the air flow in the vicinity of the optical head increased in the optical disk device of the present invention as compared with the conventional optical disk device regardless of the position of the through hole 2a. Particularly, it turned out that the velocity of air flow in the vicinity of the optical head increased when the through hole 2a was located nearest at the optical head.

As a result of the analysis, it turned out that air above the disk moved to the opposite side to the disk with a rotation of the disk by provision of the through hole 2a so that it was introduced to the surrounding of the optical head and circuit board. It was verified that this air flow enhanced heat dissipation from the optical head and circuit board.

Figure 5:
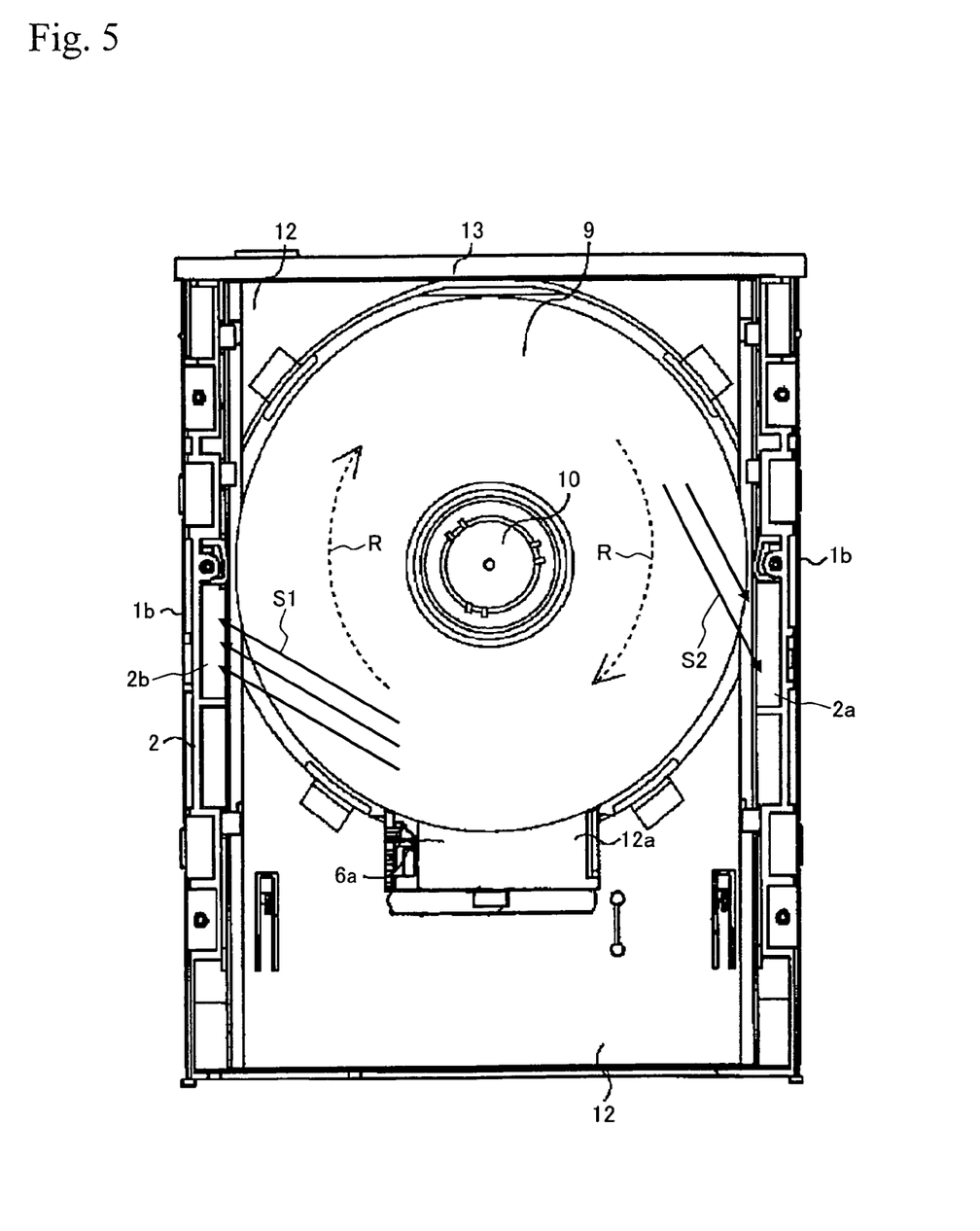
FIG. 5 is an explanatory diagram for explaining air flow in a second example of the optical disk device of the present invention.

A second example of the optical disk device of the present invention will be described with reference to FIG. 5. The optical disk device of this embodiment is provided with the through holes provided on both sides of the disk. The first through hole 2a located on the left side as the optical disk device is seen from its front panel is the same as the first example shown in FIG. 2. The through hole 2b on the right side as the optical disk drive unit is seen from the front panel of the optical disk device is a second through hole added in this example. The shape and dimension of the second through hole 2b may be the same as the shape and dimension of the first through hole 2a. Although the second through hole 2b is provided at any position, a distance from the front panel 13 to the second through hole 2b may be equal to a distance from the front panel 13 to the first through hole 2a.

Air flow will be described. Air in the vicinity of the surface of the disk receives a force in the tangential direction and centrifugal force with a rotation of the disk 9 and moves toward the mechanical block base 2 on both sides. Air collides with the side walls of the mechanical block base 2 and enters the through holes 2a, 2b. Consequently, air flows in two directions of arrows S1, S2 are generated. Air after entering the through holes 2a, 2b flows in the opposite side to the disk so that it flows through the inside of the optical disk device. Thus, air flow is generated in the inside of the optical disk device so as to enable heat dissipation from components and devices having a high temperature. In this example, heat dissipation characteristics of components and devices are raised because the amount of air flowing through the inside of the optical disk device is sufficiently larger than the first example shown in FIG. 2.

Figure 6:
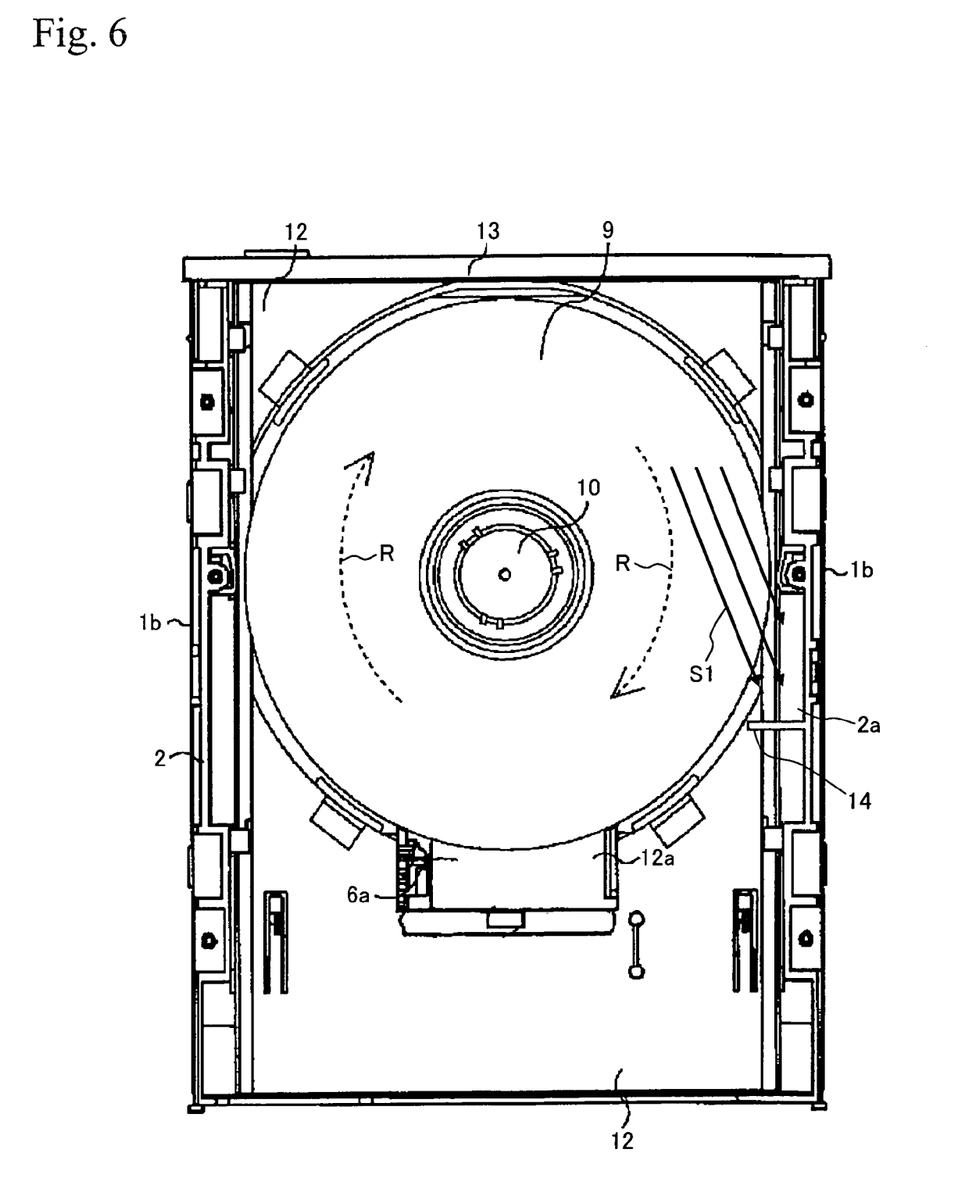
FIG. 6 is an explanatory diagram for explaining air flow in a third example of the optical disk device of the present invention.

A third example of the optical disk drive unit of the present invention will be described with reference to FIG. 6. In the optical disk device of this example, a protrusion 14 is provided on the edge of the through hole 2a. The protrusion 14 is provided on the edge of the rear end portion of the optical disk device of two edges of the through hole 2a. The protrusion 14 may be formed by extending the rib.

Air flow will be described. Air in the vicinity of the surface of the disk receives a force in the tangential direction and centrifugal force and moves in a direction to the mechanical block base 2. Air collides with the side wall of the mechanical block base 2 and part thereof enters the through hole 2a. Thus, air flow in the direction of an arrow S1 is generated. However, part of air colliding with the side wall of the mechanical block base 2 changes its traveling direction and travels to the rear end portion of the optical disk device. This air collides with the protrusion 14 and enters the through hole 2a. In this example, the heat dissipation characteristics of components and devices are raised because the amount of air flowing through the inside of the optical disk device is sufficiently larger than the first example shown in FIG. 2.

Figure 7:
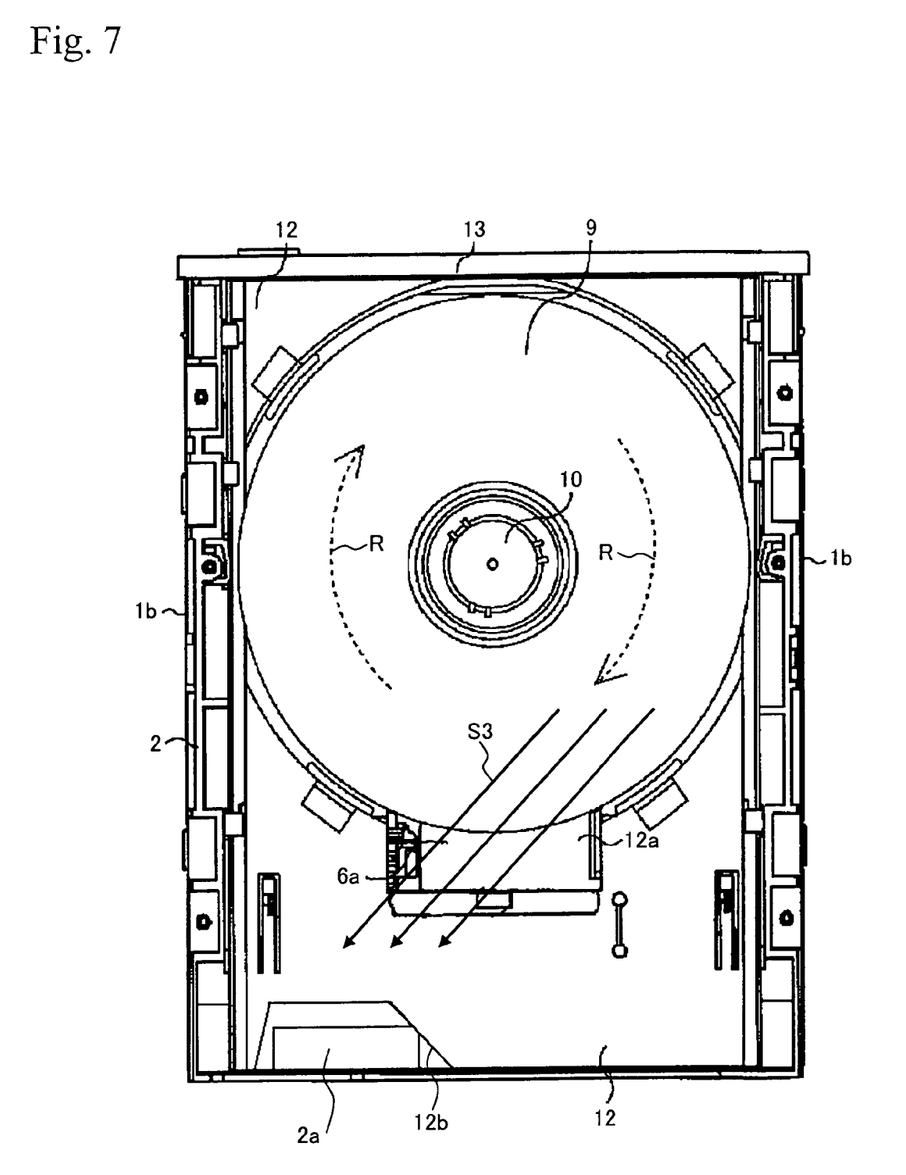
FIG. 7 is an explanatory diagram for explaining air flow in a fourth example of the optical disk device of the present invention.

A fourth example of the optical disk device of the present invention will be described with reference to FIG. 7. The optical disk drive unit of this example has a cutout 12b in the tray 12. A cutout 12a is provided on the rear end side of the optical disk device. The through hole 2a is formed between the rear end portion of the tray 12 and the inner wall on the rear end portion of the mechanical block base 2. The through hole 2a is disposed on the underside of the cutout 12b. The dimension of the cutout 12b is larger than the dimension of the through hole 2a.

Air flow will be described. Air in the vicinity of the surface of the disk receives a force in the tangential direction and centrifugal force. The disk 9 is not in the vicinity of the mechanical block base 2 on an opposite side to the front panel. Thus, air moves in the direction of an arrow S3. This air collides with the rear wall of the mechanical block base 2 and part thereof enters the through hole 2a through the cutout 12b. Air after entering the through hole 2a flows to the opposite side to the disk so that it flows through the interior of the optical disk device. Therefore, air flow is generated inside the optical disk device so as to enable heat dissipation from components and devices having a high temperature.

The respective examples of the present invention have been described. The present invention is not restricted to the above examples but it is easily understood by those skilled in art that the present invention may be changed in various ways within the range of the invention described in the scope of claims.

What is claimed is:

1. An optical disk device comprising: a mechanical block base equipped with a disk motor and an optical head; a tray for moving a disk between a projection position and a retraction position; and a through hole formed between the edge portion of the tray and the side portion of the mechanical block base, wherein when the disk is rotated, air flows from space on the disk side to space on the opposite side to the disk through the through hole of spaces on both sides of the tray.

2. The optical disk device according to claim 1 wherein the through hole is provided outside of the disk in a radius direction.

3. The optical disk device according to claim 1 wherein the through hole is provided outside of the tray along the radius direction of the disk.

4. The optical disk device according to claim 1 wherein the through hole is provided on the left side of the disk as seen from the front panel side.

5. The optical disk device according to claim 1 wherein the through holes are disposed on the right and left sides of the disk as seen from the front panel side.

6. The optical disk device according to claim 1 wherein the through hole is provided on the rear end side thereof and a cutout is provided at a position corresponding to the through hole.

7. The optical disk device according to claim 1 wherein a protrusion is provided on the edge on the rear end side of the through hole.

8. An optical disk device comprising: a top cover, bottom cover, mechanical block base disposed between the top cover and the bottom cover, chassis mounted on the mechanical block base, disk motor mounted on the chassis, optical head, and optical head feeding motor, the optical disk device further including a through hole formed between the edge portion of the tray and the side portion of the mechanical block base, wherein when the disk is rotating, air flows from space on the disk side to space on the opposite side to the disk, of spaces on both sides of the tray.

9. The optical disk device according to claim 8 wherein the through hole is disposed in the vicinity of the optical head.

10. The optical disk device according to claim 8 wherein the length of an opening of the through hole is larger than 30% of the radius of the disk.

* * * * *